US012560503B2

(12) United States Patent
Aechtler et al.

(10) Patent No.: US 12,560,503 B2
(45) Date of Patent: Feb. 24, 2026

(54) METHOD OF INTEGRITY TESTING OF A SINGLE-USE SYSTEM

(71) Applicant: Hoffmann-La Roche Inc., Little Falls, NJ (US)

(72) Inventors: Karen Aechtler, Mannheim (DE); Thomas Raetz, Mannheim (DE); Gerald Zieres, Mannheim (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 538 days.

(21) Appl. No.: 17/744,237

(22) Filed: May 13, 2022

(65) Prior Publication Data

US 2022/0268658 A1     Aug. 25, 2022

Related U.S. Application Data

(63) Continuation of application No. PCT/EP2020/082085, filed on Nov. 13, 2020.

(30) Foreign Application Priority Data

Nov. 14, 2019     (EP) .................................... 19209197

(51) Int. Cl.
*G01M 3/00* (2006.01)
*G01J 5/00* (2022.01)
*G01M 3/22* (2006.01)

(52) U.S. Cl.
CPC ........... *G01M 3/002* (2013.01); *G01J 5/0014* (2013.01); *G01M 3/227* (2013.01); *G01J 2005/0077* (2013.01)

(58) Field of Classification Search
CPC ........ G01M 3/002; G01M 3/227; G01M 3/38; G01M 3/226; G01J 5/0014; G01J 2005/0077
See application file for complete search history.

(56) References Cited

U.S. PATENT DOCUMENTS 5,523,569 A      6/1996  Hornfeld et al.
10,197,470 B2 *  2/2019  Waxman ............ G01N 21/3504
(Continued)

FOREIGN PATENT DOCUMENTS

CN      107024322 A      8/2017
CN      107430044 A      12/2017
(Continued)

OTHER PUBLICATIONS

Translation of 2000088781A (Year: 2000).*
(Continued)

*Primary Examiner* — Jonathan M Dunlap
(74) *Attorney, Agent, or Firm* — Bose McKinney & Evans LLP

(57)     ABSTRACT

Disclosed is a method of integrity testing of a single-use system for processing a fluidic material. In the inventive method, a single-use system for processing at least one fluidic material is provided. The single-use system has at least one plastic component. A test gas is applied to a lumen of the single-use system. The test gas has one or more of spectral absorption or spectral emission properties in the infrared spectral range distinguishable from ambient air. At least a part of the single-use system is monitored using an infrared camera. A method of processing a fluidic material by using a single-use system and a test system for integrity testing of a single-use system are also disclosed.

26 Claims, 4 Drawing Sheets

(56) References Cited

U.S. PATENT DOCUMENTS

| | | | | |
|---|---|---|---|---|
| 2010/0127173 | A1* | 5/2010 | Schmidt | G01M 3/38 |
| | | | | 250/338.5 |
| 2014/0008526 | A1 | 1/2014 | Zeng et al. | |
| 2014/0362226 | A1* | 12/2014 | Xu | G01M 3/38 |
| | | | | 348/164 |
| 2015/0068288 | A1* | 3/2015 | Gaudet | F17D 5/04 |
| | | | | 73/40.7 |
| 2016/0097714 | A1* | 4/2016 | Zeng | G01N 21/3504 |
| | | | | 250/338.5 |
| 2017/0138813 | A1* | 5/2017 | Xu | G01M 3/226 |
| 2018/0003641 | A1 | 1/2018 | Gamache | |
| 2019/0137386 | A1 | 5/2019 | Morimoto et al. | |
| 2019/0178743 | A1* | 6/2019 | Mcneil | G01J 3/32 |

FOREIGN PATENT DOCUMENTS

| | | |
|---|---|---|
| DE | 41 11 686 A1 | 10/1992 |
| EP | 0 632 259 A2 | 1/1995 |
| JP | H 10-246707 A | 9/1998 |
| JP | 2000-088781 A | 3/2000 |
| JP | 2000-227407 A | 8/2000 |
| JP | 2016-532133 A | 10/2016 |
| JP | 2019-66384 A | 4/2019 |
| JP | 2020-41840 A | 3/2020 |
| WO | WO 2015/049196 A1 | 4/2015 |
| WO | WO 2015/140797 A2 | 9/2015 |
| WO | WO 2018/150415 A1 | 8/2018 |
| WO | WO-2021081628 A1 * | 5/2021 ........... G01M 3/002 |

OTHER PUBLICATIONS

"Validating the Reproducibility and Reliability of Pressure Decay Methodology", Genetic Engineering & Biotechnology News, Jun. 1, 2013, vol. 33, No. 11 <https://www.genengnews.com/insights/point-of-use-disposable-bag-testing/> (Year: 2013).*

International Search Report and Written Opinion of the International Searching Authority, PCT/EP2020/082085, May 12, 2021, 17 pages.

Design, Control, and Monitoring of Single-Use Systems for Integrity Assurance, Bio-Process Systems Alliance, 2017, https://bpsalliance.org/technical-guides.

Yau et al., Studies on the Indoor Air Quality of Pharmaceutical Laboratories in Malaysia, International Journal of Sustainable Built Environment, vol. 1, No. 1, 2012, pp. 110-124.

Thermal Environmental Conditions for Human Occupancy, Ashrae Standard, ANSI/ASHRAE Standard 55-2004 (Supersedes ANSI/ASHRAE Standard 55-1992), 2004, 34 pages.

Ding, Best Practices in Qualification of Single-Use Systems, Biopharm International, 2015, http://www.processdevelopmentforum.com/articles/best-practices-in-qualification-of-single-use-systems/.

Hagen et al., Video-rate spectral imaging of gas leaks in the longwave infrared, Proceedings of SPIE 8710, Chemical, Biological, Radiological, Nuclear and Explosives (CBRNE) Sensing IXV, 871005, May 29, 2013, Baltimore, Maryland, United States.

\* cited by examiner

METHOD OF INTEGRITY TESTING OF A SINGLE-USE SYSTEM

RELATED APPLICATIONS

This application is a continuation of PCT/EP2020/082085, filed Nov. 13, 2020, which claims priority to EP 19 209 197.3, filed Nov. 14, 2019, the entire disclosures of both of which are hereby incorporated herein by reference.

BACKGROUND

This disclosure teaches a method of integrity testing of a single-use system for processing at least one fluidic material and to a test system for integrity testing of at least one single-use system for processing at least one fluidic material. This disclosure further relates to a method and a processing system for processing at least one fluidic material. The methods and systems according to this disclosure specifically may be used for processing pharmaceutical materials, such as for pharmaceutical material preparation and/or pharmaceutical packaging, including packaging of vaccines and other biological or pharmaceutical materials. Other applications, however, may be feasible.

In various technical fields there exists a strong need for isolation of processes, materials or thermal energy. As an example, in the field of civil engineering or construction engineering, the quality of insulation is typically inspected by using thermal imaging cameras for detecting leakages or failures in insulation. Similarly, in the field of chemical engineering, leakage tests are used for detecting leakages in pipelines or chemical reactors, wherein various tests are generally known, including also thermal cameras for detecting emergent chemical products such as gaseous hydrocarbons.

In processing of pharmaceuticals, such as vaccines, single-use systems (SUS), also sometimes referred to as disposable systems, are often used for manufacturing, transporting, storage or packaging of pharmaceutical materials. For this purpose, single-use manufacturing technologies have been developed over the recent years, including appropriate standards for these single-use systems. An overview of single-use technology may be found in *"Design, controlling and monitoring of single-use systems for integrity assurance"*, Bio-Process Systems Alliance, 2017, available under https://bpsalliance.org/technical-guides. Single-use systems typically may comprise a plurality of plastic components made of one or more plastic materials, such as tubing, connectors, bags, containers and other components.

In single-use systems, there also exists a need for integrity assurance, including test for barrier properties and leakages. Specifically, for the manufacturing of sterile pharmaceutical products, such as vaccines, more and more single-use systems comprising plastic materials are used. Processing components made of plastic materials, however, as compared to, e.g., components made of metallic materials such as stainless steel, are sensitive against mechanical load and strain and are susceptible to possible damages and leakages.

For integrity tests of single-use systems for pharmaceutical manufacturing, various methods are generally known to the skilled person. For these tests, reference may also be made to the above-mentioned publication by the Bio-Process Systems Alliance, specifically to pages 14 to 22. Specifically, for leak detection in single-use systems, pressure decay tests are known in which pressure is applied to the system and the pressure drop due to leakages is monitored as a function of time. Other tests are known which measure the gas flow rate required to maintain system pressure during testing. Further, helium integrity tests are known in which the vessel to be tested is filled with helium and inserted into a vacuum chamber being connected to a helium mass spectrometer.

In Weibing Ding: "Best Practices in Qualification of Single-Use Systems—Bioprocess Development Forum", 10 Sep. 2015, http://www.processdevelopmentforum.com/articles/best-practices-in-qualificationof-single-use-systems/, best practices are described for the technical qualification of single-use systems for biomanufacturing processes involving fluids. The article, inter alia, lists common polymers used in most single-use components and aspects for a validation guide for a single-use system.

EP 0 632 259 A2 discloses a device for detecting leaks in components, with a device for passing gas through the component to be examined, a camera with a narrow-band filter characteristic essentially matched to the spectral absorption of the gas and a device connected to the camera for processing and displaying the recorded image of the component to be examined.

The known tests for single-use systems, however, imply several technical challenges in daily use. Thus, as outlined above, single-use systems are highly sensitive with respect to mechanical loads and strain. Consequently, for pressure tests, the pressures which are applicable to the components of the systems strongly depend on the size of the component for testing. Typically, the bigger the component to be tested, the lower the applicable pressure for testing and, consequently, the lower the sensitivity of the test. Thus, as an example, for highly sensitive components, leakages of a size in the range of 100 μm may be detected, whereas, for sterility purposes, tolerable leakages typically are well below 30 μm. Further technical challenges are induced by the fact that components of typical single-use systems are made of deformable materials, such as plastic materials. Consequently, changes in volume or lumen of the components may occur during testing, which may have a detrimental impact on the accuracy and reproducibility of the leakage measurements. Larger components typically have to be inserted into a measurement chamber. Still, more complex systems comprising tubing and bags or containers, however, typically may not be inserted into these chambers and, thus, there exists a strong need for testing these more complex systems. Further, typical leakage tests do not allow for testing of the systems or system components in a state inserted into a processing setup.

Similarly, helium integrity tests typically require the use of a vacuum chamber. Even though these tests generally are known to provide for higher reliability and high resolution, these helium tests generally require a significant technical effort. Further, the possible geometry of the components for testing is limited by the size of the vacuum chamber. Also, as for the pressure tests, testing in a state inserted into a processing setup is generally not possible for helium tests.

Further, both for pressure tests and for helium tests, the tests typically are suited for detecting a sum leakage, only. Thus, pressure or helium pouring out of all of the leakages is integrated by the measurement setup, without distinguishing between one large opening or a plurality of smaller leakages. For the purpose of integrity, however, a plurality of small leakages, such as a plurality of leakages having an effective size significantly smaller than 30 μm, still may provide for sufficient sterility barrier and may still prevent ingression of microbes such as bacteria, whereas a large leakage does not.

Consequently, despite the advantages and progress achieved for single-use systems over the recent years, there remain some significant technical challenges in the context of integrity testing. Thus, there generally is a need for testing without the necessity of using large testing chambers including vacuum chambers. There further is a need for testing larger single-use systems including larger components or assemblies of components. Further, it is desirable to test components or even full systems in an integrated state, such as integrated into a processing setup, such as a manufacturing setup and/or a packaging setup. Further, there is a need for distinguishing between small leakages and large leakages, as opposed to the known integrating methods. Further, the above-mentioned possible errors of leakage measurements due to the elasticity or deformable character of the components should be avoided by the measurement. And last but not least, the sensitivity of the leakage tests should be increased, since a resolution of leakages down to 10 μm is typically required for securely preventing the ingression of microbial contaminations.

SUMMARY

It is therefore desirable to provide methods, devices and systems which address the above-mentioned technical challenges of single-use systems for processing through the materials, such as gaseous and/or fluid materials, specifically in the field of pharmaceutical manufacturing or packaging. Specifically, methods and systems are desirable which allow for integrity testing of single-use systems at low cost, with high throughput, with low risk of damage of the single-use systems and with high sensitivity with respect to leakages.

This problem is addressed by a method of integrity testing of a single-use system for processing at least one fluidic material and by a test system for integrity testing of at least one single-use system for processing at least one fluidic material, as well as by a method and a processing system for processing at least one fluidic material.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. Further, it should be understood that various structural terms used throughout this disclosure and claims should not receive a singular interpretation unless it is made explicit herein. By way of non-limiting example, the terms "fluidic material," "plastic component" and "test gas" should be interpreted when appearing in this disclosure and claims to mean "one or more" or "at least one." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of this disclosure, a method of integrity testing of a single-use system is disclosed, wherein the single-use system is configured for processing at least one fluidic material, specifically for use in pharmaceutical processing. The method comprises the following steps. The method steps specifically may be performed in the given order. Still, a different order is also possible. It is also possible to perform two or more method steps simultaneously or in a timely overlapping fashion. Thus, it is further possible to perform one, two or even all of the method steps repeatedly. The method may comprise additional method steps, which are not listed.

The method comprises the following steps:
  i.) providing at least one single-use system for processing at least one fluidic material, the single-use system having at least one plastic component;
  ii.) applying, specifically via at least one connector of the single-use system, at least one test gas to at least one lumen of the single-use system, wherein the test gas has one or more of spectral absorption or spectral emission properties in the infrared spectral range being distinguishable from ambient air;
  iii.) monitoring at least a part of the single-use system by using an infrared camera.

The method specifically, as will be outlined in further detail below, may be configured for leakage testing on a micrometer scale, such as for detecting single leakages having a diameter or equivalent diameter of less than 100 μm, specifically less than 50 μm, such as for detecting leakages down to, e.g., 5 μm to 10 μm.

The term "integrity testing" as used herein is a broad term and is to be given its ordinary and customary meaning to a person of ordinary skill in the art and is not to be limited to a special or customized meaning. The term specifically may refer, without limitation, to the process of obtaining at least one item of information on an integrity of an object. Therein, the term "integrity" also is a broad term and is to be given its ordinary and customary meaning to a person of ordinary skill in the art and is not to be limited to a special or customized meaning. The term specifically may refer, without limitation, to the property of an object of fulfilling one or more integrity criteria. Specifically, the integrity and the integrity testing may refer to the leakage tightness of the object, specifically an object having at least one lumen which is surrounded by one or more walls. For further possible definitions and examples of the integrity, reference may be made to the above-mentioned publication by the Bio-Process Systems Alliance.

The term "single-use system" as used herein is a broad term and is to be given its ordinary and customary meaning to a person of ordinary skill in the art and is not to be limited to a special or customized meaning. The term specifically may refer, without limitation, to a system comprising one or more interacting system components, wherein the system is intended for single use and/or is configured as a disposable system.

The single-use system comprises at least one plastic component, i.e., at least one component fully or partially made of at least one plastic material. As an example, the at least one plastic material may comprise at least one plastic material, such as one or more materials selected from the group consisting of: a polyethylene, such as a low-density polyethylene and/or a high-density polyethylene; polypropylene, a substituted polyethylene; a fluorinated polymer; a silicone material; a polycarbonate; an ethylene vinylacetate polymer; a polyester; a composite material; a multilayer film; a polytetrafluoroethylene; a polyvinylidene fluoride; a polyvinylidene difluoride; an ethylene-vinyl acetate; a poly (ether-sulfone).

As an example, the at least one plastic component of the single-use system may comprise at least one plastic component selected from the group consisting of: at least one connector element at least partially made of plastic; at least one tubing element at least partially made of plastic; at least one bag element at least partially made of plastic; at least one container element at least partially made of plastic; at least one valve element at least partially made of plastic; at least one filter capsule; at least one sampling system, such as at least one sampling system comprising at least one bag and/or at least one capsule; at least one syringe. For further options and/or embodiments of the single-use system, reference may also be made to the above-mentioned publication by the Bio-Process Systems Alliance. Other options, however, are feasible. The method of integrity testing may refer to the integrity testing of one or more single-use systems. Further, the method of integrity testing may refer to the integrity testing of the full single-use system or of at least a part of the single-use system. In addition to the at least one plastic component, the single-use system may also comprise at least one component made of at least one non-plastic component, such as at least one component made of at least one metallic material. Thus, as an example, the single-use system may be made, by mass, of at least 50% plastic components and, additionally and optionally, of one or more further components made of other materials, such as metal. Thus, as an example, the single-use system may comprise one or more plastic components, such as one or more plastic tubings, and, in addition, one or more metal components, such as one or more of at least one metallic connector element and at least one metallic valve.

The single-use system is configured for processing at least one fluidic material. The term "fluidic material" as used herein is a broad term and is to be given its ordinary and customary meaning to a person of ordinary skill in the art and is not to be limited to a special or customized meaning. The term specifically may refer, without limitation, to at least one bulk material, such as at least one of a liquid material, a gaseous material and a powder. Mixtures of two or more materials are also possible.

For the purpose of processing the at least one fluidic material, the single-use system may comprise, as outlined above, at least one component, specifically at least one plastic component, having at least one lumen surrounded by at least one wall, preferably at least one wall fully or partially made of at least one plastic material. Thus, the single-use system may comprise at least one hollow and/or tubular component through which at least one fluidic material, such as at least one gaseous material and/or at least one fluid material, may flow. Additionally or alternatively, the single-use system may comprise at least one storage for container component into which at least one fluidic material, such as at least one gaseous material and/or at least one fluid material, may be temporarily or permanently filled, such as for storage purposes and/or for other purposes such as for transfer of fluids, reaction, phase-change, mixing, portioning, separation or other processes or process steps which typically are performed with fluidic materials. Again, additionally or alternatively, the single-use system may comprise one or more connectors through which one or more materials may enter the single-use system and/or may leave the single-use system, such as one or more ports. Other components may be present in the single-use system, as the skilled person will recognize, such as one or more valves, one or more regulators, one or more sensors and the like.

As outlined above, in step i.), the at least one single-use system is provided. For providing the single-use system, various options are feasible. Thus, as an example, the single-use system may comprise one or more components. In the context of step i.), the single-use system may be assembled or may be provided, such as by purchasing, in a pre-assembled state. The single-use system may be provided in a stage ready for use for processing at least one fluidic material and/or may be provided in a partially assembled state, such as by providing a partial single-use system, wherein, before processing the fluidic material, further assembly steps may be required, such as by connecting several partial single-use systems.

In step ii.), the method comprises applying at least one test gas to at least one lumen of the single-use system. As outlined above, the term "lumen" as used herein is a broad term and is to be given its ordinary and customary meaning to a person of ordinary skill in the art and is not to be limited to a special or customized meaning. The term specifically may refer, without limitation, to an inner space of the single-use system which is fully or partially surrounded by at least one wall of the single-use system. The lumen may have a tubular shape and/or may have another shape, such as typically is the case for, e.g., bag elements and/or container elements of the single-use system. The wall, as an example, specifically may be made of the at least one plastic material.

The application of the at least one test gas specifically may take place via at least one test gas supply, such as one or more test gas supplies selected from the group consisting of: a test gas bottle; a test gas container; a test gas generator; a test gas pipeline; a test gas tube; a pump for pressing or conveying the test gas into the lumen. The test gas supply preferably may provide the test gas externally to the at least one lumen of the single-use system. Additionally or alternatively, however, one or more test gases may be applied which are at least partially generated within the single-use system, such as by applying one or more process gases as a test gas, such as one or more gases used or generated during processing, e.g., gases generated during fermentation and/or one or more inert gases. The application of the test gas specifically may take place via at least one connector of the single-use system. Thus, as an example, the single-use system may comprise at least one of a screw connector, a plug-in connector, a luer lock connector, a bayonet connector or the like. The at least one connector may be dedicated to the application of the test gas. Alternatively, however, the at least one connector may also have dual use and may also be used later on in the processing of the fluidic material, such as as for supplying one or more fluidic materials to the single-use system. Thus, as an example, the at least one connector may alternatively be connectable to the test gas supply or to a supply of the at least one fluidic material. For switching between these options, the at least one connector may also comprise at least one valve, such as at least one switchable valve, e.g., a 3-way valve. The test gas supply may comprise at least one sterile filter. The sterility and/or the pureness of the test gas may be checked on a regular basis.

The term "test gas" as used herein is a broad term and is to be given its ordinary and customary meaning to a person of ordinary skill in the art and is not to be limited to a special or customized meaning. The term specifically may refer, without limitation, to a gaseous material which is dedicated for the integrity testing of the single-use system. Therein, pure materials or mixtures of materials may be used for the test gas. As further outlined above, the at least one test gas is chosen such that the test gas is configured for emitting electromagnetic radiation in the infrared spectral range and/or for absorbing electromagnetic radiation in the infrared spectral range, such that the spectral absorption and/or spectral emission properties of the test gas in the infrared spectral range are distinguishable from ambient air. As generally used herein, the term "infrared spectral range" is a broad term and is to be given its ordinary and customary meaning to a person of ordinary skill in the art and is not to be limited to a special or customized meaning. The term specifically may refer, without limitation, to the spectral range of electromagnetic radiation having one or more wavelengths or wavelength components in the range of 780 nm to 1 mm, or having frequencies of frequency components in the range of 300 GHz to 400 THz, or having wave numbers in the range of 10 cm$^{-1}$ to 12800 cm$^{-1}$.

As an example, the molar attenuation coefficient of the test gas may differ from the one of ambient air by at least a factor of 1.1, more specifically by at least a factor of 1.5, a factor of at least 2.0 or even more. As an example, the molar attenuation coefficient of the test gas may generally be greater than 1. Additionally or alternatively, the test gas may emit electromagnetic radiation in the infrared spectral range, wherein the emission properties differ from ambient air. As an example, the test gas may comprise or may be at least one molecule having at least one bond or group being capable of oscillating at a frequency in the infrared spectral range. As an example, it is generally known to the skilled person that carbon dioxide emits electromagnetic radiation in the infra-red spectral range, which is believed to be due to the specific molecular structure of this molecule. Thus, without wishing to be bound by this theory, carbon dioxide has double bonds in which the carbon atom is interposed in between two oxygen atoms, wherein the carbon atom and each of the oxygen atoms are connected by double bonds and wherein the carbon atom may oscillate at a frequency of approximately 70 THz, corresponding to a wave number of approximately 2349 cm$^{-1}$ and a wavelength of approximately 4.26 μm. Consequently and as an example, the test gas may comprise carbon dioxide and/or may consist of carbon dioxide. It shall be noted, however, that other test gases having infrared spectral properties may also be used in addition or alternatively.

The single-use system, specifically, may be sterile and/or may be fully or partially sterilized during the process and/or prior to the process. As an example, the single-use system may fully or partially be sterilized by using gamma steril-ization and/or other sterilization method known to the skilled person. Consequently, the application of the at least one test gas specifically may take place in a sterile manner, such as by using at least one sterile filter, such as two or more sterile filters through which the test gas is guided before, during or after entering one or more further compo-nents of the single-use system.

As further outlined above, in step iii.), at least one part of the single-use system is monitored by using at least one infrared camera. Therein, one or more infrared cameras may be used. The term "infrared camera" as used herein is a broad term and is to be given its ordinary and customary meaning to a person of ordinary skill in the art and is not to be limited to a special or customized meaning. The term specifically may refer, without limitation, to a spatially resolving optical detector which is capable of detecting at least one spectral property of at least one object or an environment in a spatially resolved fashion, wherein the spectral property is a spectral property in the infrared spectral range. Infrared cameras sometimes also are referred to, without limitation of the spectral range, as thermographic cameras or thermal imaging cameras. As an example, the at least one infrared camera may comprise at least one infrared camera chip having a plurality of pixels being sensitive in the infrared spectral range, such as a CCD and/or a CMOS chip. Therein, many sensors which are suitable for infrared detection are generally known to the skilled person, such as photodiodes or photoconductors sensitive in the infrared spectral range. As an example, narrow band gap semicon-ductors may be used, such as one or more of indium antimonide, indium arsenide, mercury cadmium telluride, lead sulfide, lead selenide or combinations thereof. Further, additionally or alternatively, materials or photosensitive elements may be used which are suited for changing one or more of resistance, voltage or current when heated by infrared radiation. The at least one infrared camera chip may be cooled, such as actively, such as by using at least one cooling element such as a Stirling cooler, Peltier elements, liquid nitrogen, liquid helium or the like. Besides the at least one infrared camera chip, the at least one infrared camera may comprise one or more optical elements, such as one or more of a lens, a prism, a reflector, an optical concentrator, a diaphragm or combinations thereof. The at least one optional optical element may be made of one or more materials suited for transmitting electromagnetic radiation in the infrared spectral range. Thus, as an example, one or more materials selected from the group consisting of germanium, calcium fluoride or crystalline silicon may be used. Other materials are feasible. The at least one optical element may also have an antireflective coating. As an example, a heat detection camera and/or a gas detection camera may be used, such as a commercially available heat and/or gas detection camera. As an example, a commercially available infrared camera may be used such as available from FLIR Systems, Inc., Wilsonville, Oregon, USA, e.g., cameras of the GF series, such as GF343. Other infrared cameras may be usable, too. These heat detection cameras typically are used for engineering, housing or large industrial facilities, e.g., for detecting heat insulation product leakages or leakages in large pipelines. Surprisingly, as will be shown later on, these infrared cameras, in the context of this disclosure, may also be used on a micron scale, for detecting leakages down to micrometers or less, specifically if a temperature gradient is established between the test gas and the background, such as the ambient atmosphere and/or the background element, for increasing sensitivity.

The term "monitoring" as used herein is a broad term and is to be given its ordinary and customary meaning to a person of ordinary skill in the art and is not to be limited to a special or customized meaning. The term specifically may refer, without limitation, to one or more of detecting at least one property of an object and detecting a change of the at least one property of the object over time. As an example, the at least one property may be chosen from the group consisting of a physical property, a chemical property or a biological property. In the present case, the monitoring specifically may refer to at least one optical property and/or at least one mechanical or fluidic property of the at least one part of the single-use system, such as a leakage and/or an egression of the test gas from the single-use system.

The monitoring specifically may comprise taking one or more images of the at least one part of the single-use system. Therein, a single image, a series of images or a video may be taken. The monitoring specifically may also comprise, as will be outlined in further detail below, deriving at least one item of information, such as at least one item of integrity information, from the at least one image. The at least one item of integrity information specifically may comprise at least one item of leakage information. For this purpose, the monitoring may fully or partially be computer-implemented or supported by at least one computer. Specifically, the monitoring may comprise using one or more image recognition algorithms.

The method specifically may return at least one item of integrity information on the integrity of the single-use system. Thus, the at least one item of information on the integrity of the single-use system may comprise at least one item qualifying and/or quantifying the integrity of the single-use system, such as whether the single-use system fulfills one or more integrity criteria or not, such as criteria with respect to leakage properties. As an example, the at least one item of integrity information may comprise at least one item of information indicating whether the single-use system comprises one or more leakages having a diameter or equivalent diameter exceeding at least one predetermined threshold value, such as a threshold value of 30 μm, 20 μm or 10 μm. The at least one item of integrity information may be or may comprise a binary item of integrity information, such as an item of integrity information simply indicating whether one or more integrity criteria are fulfilled or not. Additionally or alternatively, the at least one item of integrity information may also comprise additional information, such as information quantifying the degree of conformance with one or more integrity criteria.

As outlined above, the test gas specifically may comprise carbon dioxide. The method specifically may be performed in ambient air, specifically at normal conditions, or at normal pressure of 1013 mbar and at room temperature of 25° C. Specifically, the single-use system and/or the test gas may have the same temperature as the ambient air.

As an example, the ambient air, where performing the method, may have a flow velocity u. The flow velocity of the ambient air may occur randomly, such as by accident. Additionally or alternatively, the flow velocity of the ambient air may be controlled and thus may occur due to specifically regulated ambient conditions, such as for example in a cleanroom environment. Thus, generally, the method may comprise using at least one flow controller, wherein the flow controller is configured for controlling at least one of: a flow velocity of the ambient air; a mass flow rate of the ambient air; a volume flow rate of the ambient air. The flow controller, as an example, may comprise at least one venting device. Further, additionally or alternatively, the flow controller may comprise at least one filtering device for filtering the ambient air, such as a HEPA filter. As an example, the ambient air, such as the air surrounding the single-use system when performing the method, may travel at a speed between 0 and 0.5 meters per second (m/s). Thus, the flow velocity u of the ambient air may specifically be 0 m/s$<$u$\leq$0.5 m/s, more specifically 0.05 m/s$\leq$u$\leq$0.3 m/s. A measurement of the flow velocity may be an optional component of the method.

The single-use system may fully be made of one or more plastic components. Alternatively, however, hybrid systems are also feasible, such as systems comprising one or more plastic components and one or more components made of other materials, such as metal. In case a leakage test as part of the integrity testing, the leakage test may be performed for the at least one plastic component and/or for at least one interface between at least two plastic components and/or between at least one plastic component and at least one non-plastic component. Therein, the integrity of the entire system or the integrity of one or more components of the system may be tested.

As outlined above, the method may fully or partially be computer-controlled or even computer-implemented. Therein, specifically, one or more of steps ii.) and iii.) may be computer-controlled or even computer-implemented. Thus, as an example, the method may make use of at least one computerized valve for applying the test gas and/or for controlling the test gas, such as a flow of the test gas and/or a pressure of the test gas. Additionally or alternatively, the monitoring of the at least one part of the single-use system by using the at least one infrared camera may be computer-controlled or even computer-implemented. Thus, as an example, the at least one infrared camera may be connected to at least one computer having at least one processor, wherein the at least one computer is configured, such as by software programming, for controlling infrared camera and/or for processing data such as image data provided by the infrared camera. The computer may be part of an evaluation system or evaluation device. The computer may also be configured for image processing, such as for evaluating one or more images provided by the infrared camera and/or for deriving one or more items of information from one or more images provided by the infrared camera, such as one or more items of integrity information.

The method may further imply optically improving a contrast of one or more images provided by the at least one infrared camera. Specifically, in the infrared spectral range, the quality of the images and/or the contrast of the images may strongly depend on controlling environmental conditions such as environmental temperature or background temperature. Thus, the method may fully or partially be performed in a temperature-controlled environment. Additionally or alternatively, step iii.) may comprise providing at least one background element, wherein the at least one part of the single-use system monitored by using the infrared camera is positioned at least partially between the background element and the infrared camera. Specifically, the at least one background element may be fully or partially located within a field of view of the infrared camera, such that the background element is visible as a background in the at least one image captured by the infrared camera. Consequently, the term "monitoring" as used herein is a broad term and is to be given its ordinary and customary meaning to a person of ordinary skill in the art and is not to be limited to a special or customized meaning. The term specifically may refer, without limitation, to an element forming a visible background in at least one image of the infrared camera. The background element specifically may be or may comprise a flat or curved surface, such as a screen or screen surface. As an example, the background element may comprise at least one visually uniform background screen, wherein the visual uniformity specifically may lead to a non-uniformity in the infrared spectral range used by the infrared camera of preferably no more than 10%, preferably of no more than 5%, of no more than 2% or even of no more than 1% with respect to intensity variations over an image of the background element taken by the infrared camera.

For the monitoring of the at least part of the single-use system in step iii.), at least part of the single-use system may not only be located within a field of view of the infrared camera, but specifically single-use system may be positioned at a distance d from the infrared camera. As an example, the distance d between the single-use system and the infrared camera may allow for a sufficient and safe monitoring of single-use system. In particular, the single-use system may be positioned at a distance of up to 2 meters (m) from the infrared camera, such that the distance d may be 0 m<d≤2 m. Specifically, the distance d between the single-use system and the infrared camera may be 0.05 m≤d≤1.5 m. More specifically, the distance d between the single-use system and the infrared camera may be 0.1 m≤d≤1.2 m. Preferably, the distance d between the single-use system and the infrared camera may be 0.25 m≤d≤1 m. More preferably the distance d between the single-use system and the infrared camera may be 0.5 m.

The single-use system may further be positioned at a distance L from the at least one background element, e.g., provided in step iii.) of the method. In particular, the single-use system may be positioned at a distance of up to 0.5 meters from the background element, such that the distance L may be 0 m≤L≤0.5 m. Specifically, the distance L between the single-use system and the background element may be 0.05 m≤L≤0.25 m. More specifically, the distance L between the single-use system and the background element may be 0.08 m≤L≤0.15 m. Preferably, the distance L between the single-use system and the background element may be 0.1 m.

The at least one background element may be mechanically disconnected from the infrared camera. Alternatively, however, the background element may also be mechanically connected to the infrared camera. Thus, as an example, the method may make use of a frame, mount or rack connecting the at least one infrared camera with the at least one background element, in order to provide for defined and reproducible spatial positioning between these elements. In between, the mount, rack or frame may leave sufficient space for the at least one single-use system and/or the at least one part thereof.

The at least one background element specifically may fully or partially be temperature-controlled. Thus, as an example, the at least one background element may comprise at least one temperature controller. Additionally or alternatively, the at least one background element may comprise at least one heating element and/or at least one cooling element as well as at least one temperature sensor. Generally, the at least one background element may be one or both of actively heated and/or actively cooled, specifically by at least one of a fluidic tempering element and an electric tempering element, more specifically at least one Peltier element. Additionally or alternatively, however, a passive heating and/or a passive cooling is also possible. Other means of heating and/or cooling may be used alternatively or in addition.

The background element, sometimes also referred to as warm background and/or a tempered background, even though cold tempered background generally also are feasible, may for example be or may comprise at least one of a cold plate, a hot plate and/or heating or cooling panel. In particular, the background element may be or may comprise one or more of a hot plate, a cold plate a cooling panel and/or a heating panel cooled and/or heated by using one or more electric tempering element, e.g., electric heating elements, such as for example at least one electrical heating wire. As an example, the electric tempering element of the background element may be arranged in meanders within the plate and/or panel.

Additionally or alternatively, the background element may be or may comprise at least one plate and/or panel tempered by using one or more fluids, e.g., at least one fluidic tempering element. Thus, as an example, at least one fluid, e.g., water, may be transferred through the plate and/or panel for tempering the plate and/or panel. As an example, the fluidic tempering element may be arranged in meanders within the plate and/or panel. Specifically, the fluid may be guided through the background element in meanders.

As an example, the background element may at least partially be made of one or more of a plastic material, a ceramic material and a metal material. Specifically, the plastic material may be or may comprise one or more of an acrylic material, for example, an acrylic glass, e.g., poly methyl methacrylate (PMMA), and/or a polyvinylchloride (PVC) material, such as a PVC foil. Additionally or alternatively, the background element may be made of a metal material, such as aluminum. In particular, the background element may comprise at least one anodized aluminum, e.g., as a surface material. Additionally or alternatively, the anodized aluminum of the background element may, e.g., on its outer surface, be coated with a plastic material, such as with a colored plastic material. As an example, a black and optically matt PVC material, such as a foil, may be used for coating the outer surface of the background element. The anodized aluminum and additionally or alternatively the plastic coating as a surface material of the background element may specifically reduce reflections, such as reflections occurring due to using the infrared camera. In particular, an emission value of the background element may be improved by using the plastic coating, e.g., the black matt PVC foil.

The integrity testing may, as an example, be performed at an ambient temperature, i.e., at the temperature of the ambient atmosphere, such as 25° C. The background element may be maintained at a background temperature differing from the ambient temperature, such as at least by 1 K or by at least 2 K, in order to provide sufficient temperature contrast and, thus, sufficient contrast in the one or more images of the infrared camera. As an example, the background temperature may differ from the ambient temperature by at least 2 K, specifically by 2 to 40 K, more specifically by 4 to 30 K, preferably by 10 to 20 K. Thus, the test gas may assume a temperature equilibrium with the single-use system, such that, when the test gas egresses from the single-use system, such as from one or more leakages, the test gas may differ, in its temperature, by the same amount. Generally, the background temperature may be higher or lower than the ambient temperature. As an example, the ambient temperature may be room temperature or 25° C., and wherein the background temperature may be 26° C. to 60° C., specifically 30° C. to 50° C., more specifically 45° C.

The monitoring, as outlined above, may also comprise a full or partial evaluation of the integrity of the single-use system. Thus, step iii.) specifically may comprise detecting one or more leakages in the single-use system. As will be outlined in further detail below, the monitoring may comprise detecting, by evaluating one or more images provided by the infrared camera, test gas egressing from the single-use system. Thus, as an example, image recognition may be used for detecting and/or quantifying leakages by detecting and/or quantifying streams or jets of test gas in the one or more images.

The method specifically may comprise returning, i.e., providing and/or transmitting, at least one integrity result. As an example, the integrity result may comprise at least one item of information quantifying and/or qualifying the integrity of the single-use system. As an example, the integrity result may be provided, by a test system performing the method, to a user or operator and/or may be provided to another device, such as to a computer or computer system, in a wireless fashion and/or in a wire bound fashion. The integrity result, as an example, may be displayed visually and/or audibly to a user. Specifically, the returning of the at least one integrity result may be performed automatically, such as by at least one evaluation device of the test system performing the method and/or in a computer-implemented fashion.

As outlined above, the monitoring may also comprise fully or partially evaluating the integrity of the single-use system. Specifically, step iii.) may comprise visually detecting the egression of test gas from the single-use system. Thus, as outlined above, the test gas typically has a temperature differing from the temperature of the ambient atmosphere, thereby providing for a contrast between the test gas and the ambient atmosphere and/or between the test gas and the background element in the at least one image captured by the infrared camera.

The visual detection of the egression of the test gas specifically may comprise detecting at least one of a jet, a stream, a cloud or a mist of the test gas, specifically in the at least one image captured by the infrared camera. Thus, one or more of jets, gas streams, gas clouds or gaseous mists may be detected as linear or curved co-pending colorations in the at least one image. In the following, whenever reference is made to at least one "jet" of the test gas, this expression shall also include the option of at least one stream, cloud or mist of the test gas instead of a jet.

The visual detection specifically may take place by using image recognition, such as computerized image recognition running on the infrared camera and/or on an evaluation device such as a computer of the evaluation device. Thus, generally, the method may comprise using automatic image recognition, specifically computer-implemented image recognition, for detecting the egression of test gas from the single-use system.

The method further may comprise automatically quantifying a leakage of the single-use system by visually evaluating the jet of the test gas, specifically by using image recognition for evaluating a jet profile of the test gas. Thus, as an example, one or more parameters of a detected jet profile may be evaluated, specifically automatically, such as a length of a jet profile of the test gas and/or a width of a jet profile of the test gas. Further, image recognition may comprise using one or more artificial neural networks for image evaluation, thereby qualifying and/or quantifying leakage of the single-use system. Thus, as an example, the at least one artificial neural network may be trained by using a plurality of images of training components and/or training systems having well-defined leakages and being tested under well-defined conditions, such as under known test gas pressure.

Generally, well-defined testing conditions may be required for obtaining reproducible and reliable testing results. Thus, specifically, the pressure of the test gas may be a parameter which should be controlled, defined or at least known in a precise fashion. Thus, one or more pressure monitors or pressure sensors may be used for monitoring the pressure of the test gas in the single-use system. Additionally or alternatively, one or more flow monitors or flow sensors may be used for monitoring a flow of the test gas into the single-use system and/or out of the single-use system.

One advantage of the present method, as will be discussed in further detail below, is the fact that, generally, low pressures of the test gas may be sufficient for testing, thereby avoiding or at least reducing mechanical stress to the single-use system and/or falsifications of the measurement by elastic or inelastic stretching of one or more components of the single-use system. Generally, in step ii.), the test gas may be applied to the lumen of the single-use system at a pressure of 5 mbar to 300 mbar, specifically at a pressure of 10 mbar to 200 mbar, more specifically at a pressure of 20 mbar to 100 mbar, specifically at a pressure of 50 mbar. Even though these pressures lead to satisfying results in the visual detection of leakages by, simultaneously, low mechanical stress, other pressures of the test gas are generally feasible, too. As used in this context, the term "pressure" specifically may refer to an overpressure, i.e., a positive pressure difference between the lumen of the single-use system and the surrounding environment. Thus, the pressure specifically may be an overpressure over a normal pressure of, as an example, 1013 mbar.

As outlined above, step iii.) may comprise capturing a plurality of images of the single-use system or of at least a part thereof by using an infrared camera, such as a series of images and/or a video clip. Step iii.) specifically may comprise capturing at least one image stream, specifically a video, of the single-use system by using an infrared camera.

Step iii.) may comprise capturing at least one image of the entire single-use system, of a single component or of a group of components of the single-use system or of a part of the single-use system. Additionally or alternatively, step iii.) may comprise scanning the single-use system or a part thereof, by sequentially monitoring different parts of the single-use system. For the purpose of scanning, the at least one infrared camera and, optionally, the at least one background element may be moved relative to the single-use system or vice versa. As an example, a movable stage may be used for moving the infrared camera and/or for moving the single-use system, such that, sequentially, images of different parts of the single-use system may be captured. The movable stage, as an example, may be computer-controlled.

The infrared camera specifically may be sensitive at least in a partial spectral range within the range of 2 $\mu$m to 10 $\mu$m, specifically in the range of 3 $\mu$m to 6 $\mu$m, more specifically in the range of 4 $\mu$m to 5 $\mu$m. Thus, as outlined above, carbon dioxide is known to emit infrared radiation of approximately 4.26 $\mu$m. Generally, carbon dioxide is a suitable test gas having various advantages. Thus, carbon dioxide is, at least at low concentrations, generally non-toxic and widely inert with respect to reactions with materials typically used for single-use systems. Further, carbon dioxide is also typically inert against reactions which may take place with fluidic material subsequently filled into the single-use system. Further, the use of carbon dioxide provides for a cost-efficient means of pressurizing the single-use system.

The infrared camera may comprise, as outlined above, at least one camera chip. The at least one camera chip, as an example, may be made of one or more of the above-mentioned materials. Specifically, the at least one camera chip may be actively cooled by using at least one cooling element, such as at least one Stirling cooler. Additionally or alternatively, a cooling by using at least one cooling medium may take place, such as liquid nitrogen and/or liquid helium. The infrared camera may, as outlined above, further comprise one or more optical components and/or one or more housings, which may be thermally insulated.

In a further aspect, a method of processing at least one fluidic material by using at least one single-use system is disclosed. For definitions and examples of the processing, reference may be made of the description of the method of testing as given above. Specifically, the processing may comprise one or more of storage, reaction, phase-change, mixing, portioning, separation or other processes generally known to the skilled person. Specifically, the processing may comprise processing one or more pharmaceutical and/or biological materials, such as one or more pharmaceuticals, such as vaccines. The method comprises the following steps. The step specifically may be performed in the given order. It shall be noted however, that a different order is also possible. Thus, it is possible to perform step II. at least once before performing step I. Even though the method steps specifically may be performed independently and at different times, e.g., subsequently, it is also possible to perform the steps in a timely overlapping fashion or at least partially simultaneously. Further, it is also possible to perform one or both steps repeatedly. The method may comprise additional method steps, which are not listed.

The method comprises the following steps:
I. testing the integrity of the single-use system by using the method of integrity testing according to this disclosure, such as according to any one of the embodiments disclosed above and/or according to any one of the embodiments disclosed in further detail below; and
II. connecting the single-use system to at least one supply of at least one fluidic material and at least partially filling the single-use system with the fluidic material.

Thus, for the purpose of testing the integrity, the single-use system may be temporarily connected to at least one test gas supply configured for supplying the at least one test gas to the single-use system. The test gas supply, as outlined above, specifically may comprise at least one pressure monitor and/or at least one flow monitor. For the purpose of processing, the test gas supply may be separated or disconnected from the single-use system, and, instead, the single-use system may be connected to at least one supply of the one or more fluidic materials. Alternatively, the testing in step I. may also be performed after step II. For switching from the test gas supply to the supply of the least one fluidic material or vice versa, at least one valve may be provided, such as at least one 3-way valve. Alternatively, however, the switching between the supplies may also take place manually, such as by unplugging or other disconnecting the single-use system from the test gas supply and subsequently connecting the single-use system to the supply of the at least one fluidic material, or vice versa. The supply of the at least one fluidic material, as an example, may comprise at least one connector, to which, e.g., from a storage vessel or a pipeline, the at least one fluidic material for processing is supplied.

As an example, connecting the single-use system to at least one supply of at least one fluidic material in step II. may be performed by switching from the test gas supply to the at least one fluidic material supply by using at least one switch, such as a valve, e.g., automatically. Thus, the connecting may specifically be performed by controlling at least one switch, e.g., a valve, such as without manually separating the single-use system from the test gas supply and subsequently reconnecting the single-use system to the at least one supply of the one or more fluidic materials. Thus, as an example, the method of processing at least one fluidic material may specifically comprise providing at least one switch for switching from the at least one test gas supply to the at least one supply of the one or more fluidic materials, and vice versa. This may specifically allow testing the integrity of the single-use system directly in the same state used for processing, e.g., in a hygienic room in which also the processing of the fluidic material may take place. Thus, the switching may for example allow for in-situ testing of the integrity of the single-use system.

In a further aspect of this disclosure, a test system for integrity testing of at least one single-use system for processing at least one fluidic material is disclosed. The single-use system comprises at least one plastic component. The test system comprises:
a.) at least one test gas supply, specifically at least one test gas supply connectable to at least one connector of the single-use system, for applying at least one test gas to at least one lumen of the single-use system, wherein the test gas has one or more of spectral absorption or spectral emission properties in the infrared spectral range being distinguishable from ambient air; and
b.) at least one infrared camera for monitoring at least a part of the single-use system.

For definitions and possible embodiments of the test system, reference may be made to the description of the method of integrity testing given above.

The test system may further comprise:
c.) at least one evaluation device for evaluating the integrity of the single-use system, wherein the evaluation device is configured for deriving at least one item of integrity information from at least one image provided by the infrared camera.

The term "evaluation device" as used herein is a broad term and is to be given its ordinary and customary meaning to a person of ordinary skill in the art and is not to be limited to a special or customized meaning. The term specifically may refer, without limitation, to a device which is capable of performing one or more evaluation operations. Specifically, the evaluation device may comprise at least one processor, which may be programmed, by appropriate software, for performing one or more evaluation operations. Specifically, as outlined above, the evaluation may comprise generating at least one integrity result, such as in integrity result comprising at least one item of information on an integrity, specifically on one or more of a leakage rate, leakage dimensions or the like. The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) or the like. The processor specifically may be configured, such as by software programming, for performing one or more evaluation operations. Thus, as an example, the processor may be programmed for performing image recognition, such as discussed above.

The at least one evaluation device may fully or partially be separate from the at least one infrared camera. Additionally or alternatively, the at least one evaluation device may also fully or partially be integrated into the at least one infrared camera. Specifically, the at least one evaluation device may be connected to the at least one infrared camera, such as by a wire bound or a wireless connection. The evaluation device specifically may comprise at least one image processing system. The image processing system may fully or partially be hardware-based and/or may also fully or partially be software-based.

The test system may further comprise:

d.) at least one background element, wherein the test system is configured such that at least one part of the single-use system is positionable at least partially between the background element and the infrared camera.

For possible embodiments and definitions of the at least one background element reference may be made to the description of the method of integrity testing above. Specifically, as outlined above, the at least one background element may be connected to the at least one infrared camera by at least one mechanical connection. Alternatively, however, the at least one background element may also be located and/or positioned independently.

The test system specifically may be configured for performing the method of integrity testing according to this disclosure, such as according to any one of the embodiments disclosed above and/or according to any one of the embodiments disclosed in further detail below.

In a further aspect of this disclosure, a processing system for processing at least one fluidic material is disclosed. The processing system specifically may be configured for performing the method of processing at least one fluidic material according to this disclosure, such as according to any one of the embodiments disclosed above and/or according to any one of the embodiments disclosed in further detail below. The processing system comprises:

A. at least one single-use system for processing at least one fluidic material, the single-use system having at least one plastic component;

B. at least one test system according to any one of the preceding claims referring to a test system; and C. at least one supply of the fluidic material.

Therein, the single-use system is selectively connectable to the test gas supply of the test system and to the supply of the fluidic material, specifically in a switchable fashion.

The term "processing system" as used herein is a broad term and is to be given its ordinary and customary meaning to a person of ordinary skill in the art and is not to be limited to a special or customized meaning. The term specifically may refer, without limitation, to a device or combination of devices configured for performing at least one method of processing of materials, such as one or more fluidic materials. For possible definitions and embodiments, reference may be made to the description of the method of processing as given above.

As outlined above, the methods according to this disclosure may fully or partially be computer-implemented and/or a computer-controlled. Thus, in further aspects, computer programs and computer-readable storage media are disclosed which fully or partially control or support or perform one or more of the methods according to this disclosure, when executed on a computer or computer network. Specifically, as outlined above, step ii.) may be computer-controlled. Additionally or alternatively, step iii.) may fully or partially be computer-controlled or computer-implemented. As used herein, the term "computer-readable storage medium" specifically may refer to a non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM). The computer program may also be embodied as a computer program product. As used herein, a computer program product may refer to the program as a tradable product. The product may generally exist in an arbitrary format, such as in a paper format, or on a computer-readable data carrier and/or on a computer-readable storage medium. Specifically, the computer program product may be distributed over a data network.

The methods and systems according to this disclosure provide a large number of advantages over known systems and methods of similar kind.

Thus, specifically, by using the methods and devices according to this disclosure, integrity tests using one or more infrared cameras, such as one or more heat detection cameras and/or one or more test gas-specific cameras, may be performed, even in complex single-use systems or disposable systems. Testing before or after use of the single-use system is possible. The methods and devices specifically may be used for manufacturing a processing step by the pharmaceutical products.

The methods and devices specifically may be applied in one or more environments in which the actual processing takes place. Thus, as an example, the method of integrity testing may take place in a hygienic and/or sterile environment in which the processing of the fluidic material takes place. In other words, this disclosure may be applied at the point of use, such as a hygienic manufacturing home or facility. This disclosure may be applied both in unused state and in a used state of the single-use system, e.g., in a state in which the single-use system is contaminated with the fluidic material. Thus, as an example, the integrity testing of the single-use system may be performed before using the single-use system, such as pre-use. Additionally or alternatively, the integrity testing of the single-use system may be performed after using the single-use system, such as post-use.

The integrity testing may take place, as an example, by applying gaseous carbon dioxide and/or a mixture of test gases comprising carbon dioxide, to the single-use system. The test gas, as an example, may be applied at an overpressure of 20 to 100 mbar. The overpressure may also be adapted to the specific requirements of the single-use system and/or of a part thereof. Thus, as an example, lower overpressures may be used for bags, whereas higher overpressures may be used for tubings. The setup of the single-use system or a part thereof may be monitored by using the infrared camera which is configured for detecting carbon dioxide. Therein, a static monitoring or a scanning is possible. Leakages may immediately be visible on a display, such as the display of the camera and/or of the evaluation device, wherein the location of leakages may directly be visible by their respective orifices and, as an example, the gas jet egressing from the leakage.

The resolution of the method and the test system may significantly exceed common methods and systems. Thus, leakages smaller than 10 μm may be visible, thereby allowing for securely identifying leakages which might lead to microbial contaminations. The sensitivity and resolution as well as the reliability of the method may further be increased by adjusting the temperature and by inducing temperature gradients in the test environment and/or in the single-use system, e.g., by using the above-mentioned background element.

Thus, generally, the methods and devices of this disclosure may provide for a secure, simple and still reliable integrity testing, specifically for leakages. The testing may take place directly in a hygienic room, such as, e.g., in one or more of a clean room, a sterile room or an otherwise clean facility, in which also the further processing of the fluidic material takes place. Thus, the testing and the processing may take place in one and the same room or facility, e.g., under the same hygienic conditions.

Further, single-use systems may also be tested after the processing, e.g., in a state contaminated with the at least one fluidic material. The testing may take place without cleaning of the single-use system. It shall be noted, however, that wetted tubings may modify the results of the testing or have an impact on the testing results.

Further, the methods and devices allow for integrity testing of single leakages rather than by summarizing leakage testing, only. Thus, single leakages, such as holes, perforations, unwanted openings, cracks or other leakages may be detected directly and may be analyzed in an isolated fashion, as opposed to testing methods in which the leakages are added up to a sum value. Consequently, false positive testing for leakage may be avoided, e.g., by distinguishing between a plurality of small leakages and a single large leakage.

Due to the small overpressure which is required for testing, the above-mentioned mechanical problems may also be avoided. Thus, firstly, mechanical damages to the single-use system may be avoided. Further, falsifications of the testing by unwanted elastic or inelastic formations of the test system may also be reduced as compared to known methods of integrity testing.

Further, as outlined above, the method of testing may be performed in ambient atmosphere, without the necessity for using test chambers. Thus, as compared to e.g., known pressure tests or helium leakage tests, no pressurized chamber or vacuum chamber is required, which also allows for integrity testing at the actual point of application of the single-use system. Further, large single-use systems may be tested for integrity, without the necessity of disassembling the single-use systems down to the size of test chambers. Specifically the actual single-use system as used for processing the fluidic material may be tested.

Generally, the methods and devices according to this disclosure allow for processing at least one fluidic material by using reliable single-use systems. The single-use systems may be tested by using high reliability testing, at low cost, under realistic conditions and with results clearly showing the location and the size of possible leakages. Thereby, the process efficiency and the yield may be increased over known processing of fluidic materials, since processing using faulty equipment may widely be avoided.

Summarizing and without excluding further possible embodiments, the following embodiments may be envisaged:

Embodiment 1: A method of integrity testing of a single-use system for processing at least one fluidic material, specifically for use in pharmaceutical processing, wherein the method comprises the following steps:

i.) providing at least one single-use system for processing at least one fluidic material, the single-use system having at least one plastic component;

ii.) applying, specifically via at least one connector of the single-use system, at least one test gas to at least one lumen of the single-use system, wherein the test gas has one or more of spectral absorption or spectral emission properties in the infrared spectral range being distinguishable from ambient air;

iii.) monitoring at least a part of the single-use system by using an infrared camera.

Embodiment 2: The method according to the preceding embodiment, wherein the test gas comprises carbon dioxide.

Embodiment 3: The method according to any one of the preceding embodiments, wherein the method is performed in ambient air, specifically at normal pressure and at room temperature.

Embodiment 4: The method according to the preceding embodiment, wherein the ambient air has a flow velocity u, specifically $0 \text{ m/s} < u \leq 0.5 \text{ m/s}$, more specifically $0.05 \text{ m/s} \leq u \leq 0.3 \text{ m/s}$.

Embodiment 5: The method according to any one of the preceding embodiments, wherein the method comprises using at least one flow controller, wherein the flow controller is configured for controlling at least one of: a flow velocity of the ambient air; a mass flow rate of the ambient air; a volume flow rate of the ambient air.

Embodiment 6: The method according to any one of the preceding embodiments, wherein the at least one plastic component of the single-use system comprises at least one plastic component selected from the group consisting of: at least one connector element at least partially made of plastic; at least one tubing element at least partially made of plastic; at least one bag element at least partially made of plastic; at least one container element at least partially made of plastic; at least one valve element at least partially made of plastic; at least one filter capsule; at least one sampling system, such as at least one sampling system comprising at least one bag and/or at least one capsule; at least one syringe.

Embodiment 7: The method according to any one of the preceding embodiments, wherein the method is fully or partially computer-controlled, specifically one or more of steps ii.) and iii.).

Embodiment 8: The method according to any one of the preceding embodiments, wherein step iii.) comprises providing at least one background element, wherein the at least one part of the single-use system monitored by using the infrared camera is positioned at least partially between the background element and the infrared camera.

Embodiment 9: The method according to any one of the preceding embodiment, wherein the single-use-system (116) is positioned at a distance d from the infrared camera (126), wherein $0 \text{ m} \leq d \leq 2 \text{ m}$, specifically $0.05 \text{ m} \leq d \leq 1.5 \text{ m}$, more specifically $0.1 \text{ m} \leq d \leq 1.2 \text{ m}$, preferably $0.25 \text{ m} \leq d \leq 1 \text{ m}$, more preferably $d=0.5 \text{ m}$.

Embodiment 10: The method according to any one of the two embodiments, wherein the single-use-system (116) is positioned at a distance L from the at least one background element (132), wherein 0 m≤L≤0.5 m, specifically 0.05 m≤L≤0.25 m, more specifically 0.08 m≤L≤0.15 m, preferably L=0.1 m.

Embodiment 11: The method according to any one of the three preceding embodiments, wherein the background element comprises at least one visually uniform background screen.

Embodiment 12: The method according to any one of the four preceding embodiments, wherein the background element is mechanically connected to the infrared camera.

Embodiment 13: The method according to any one of the five preceding embodiments, wherein the background element is temperature-controlled.

Embodiment 14: The method according to any one of the six preceding embodiments, wherein the background element is one or both of actively heated or actively cooled, specifically by at least one of a fluidic tempering element and an electric tempering element, more specifically at least one Peltier element.

Embodiment 15: The method according to the preceding embodiment, wherein any one of the fluidic tempering element and/or the electric tempering element is arranged in meanders within the background element.

Embodiment 16: The method according to any one of the eight preceding claims, wherein the background element (132) is at least partially made of one or more of a plastic material, specifically an acrylic material, for example an acrylic glass, e.g., poly methyl methacrylate (PMMA), and/or a polyvinylchloride (PVC) material, such as a PVC foil; a ceramic material; and a metal material, such as aluminum.

Embodiment 17: The method according to any one of the nine preceding embodiments, wherein the integrity testing is performed at an ambient temperature, wherein the background element is maintained at a background temperature differing from the ambient temperature.

Embodiment 18: The method according to the preceding embodiment, wherein the background temperature differs from the ambient temperature by at least 2 K, specifically by 2 to 40 K, more specifically by 4 to 30 K, preferably by 10 to 20 K.

Embodiment 19: The method according to any one of the two preceding embodiments, wherein the background temperature is higher than the ambient temperature.

Embodiment 20: The method according to any one of the three preceding embodiments, wherein the ambient temperature is room temperature and wherein the background temperature is 26° C. to 60° C., specifically 30° C. to 50° C., more specifically 45° C.

Embodiment 21: The method according to any one of the preceding embodiments, wherein step iii.) comprises detecting one or more leakages in the single-use system.

Embodiment 22: The method according to any one of the preceding embodiments, wherein the method comprises returning at least one integrity result, the integrity result quantifying or qualifying the integrity of the single-use system.

Embodiment 23: The method according to any one of the preceding embodiments, wherein step iii.) comprises visually detecting the egression of test gas from the single-use system.

Embodiment 24: The method according to the preceding embodiment, wherein the visually detecting the egression comprises detecting at least one of a jet, a stream, a cloud or a mist of the test gas.

Embodiment 25: The method according to the preceding embodiment, wherein the method comprises automatically quantifying a leakage of the single-use system by visually evaluating the jet, the stream, the cloud or the mist of the test gas, respectively, specifically by using image recognition for evaluating a jet profile of the test gas.

Embodiment 26: The method according to any one of the preceding embodiments, wherein the method comprises using automatic image recognition, specifically computer-implemented image recognition, for detecting the egression of test gas from the single-use system.

Embodiment 27: The method according to any one of the preceding embodiments, wherein, in step ii.), the test gas is applied to the lumen of the single-use system at a pressure, specifically an overpressure, of 5 mbar to 300 mbar, specifically at a pressure of 10 mbar to 200 mbar, more specifically at a pressure of 20 mbar to 100 mbar, specifically at a pressure of 50 mbar.

Embodiment 28: The method according to any one of the preceding embodiments, wherein step iii.) comprises capturing a plurality of images of the single-use system by using an infrared camera.

Embodiment 29: The method according to any one of the preceding embodiments, wherein step iii.) comprises capturing an image stream, specifically a video, of the single-use system by using an infrared camera.

Embodiment 30: The method according to any one of the preceding embodiments, wherein step iii.) comprises scanning the single-use system by sequentially monitoring different parts of the single-use system.

Embodiment 31: The method according to any one of the preceding embodiments, wherein the infrared camera is sensitive at least in a partial spectral range within the range of 2 μm to 10 μm, specifically in the range of 3 μm to 6 μm, more specifically in the range of 4 μm to 5 μm.

Embodiment 32: The method according to any one of the preceding embodiments, wherein the infrared camera comprises at least one camera chip, wherein the at least one camera chip is actively cooled by using at least one cooling element.

Embodiment 33: A method of processing at least one fluidic material by using at least one single-use system, the method comprising:

I. testing the integrity of the single-use system by using the method according to any one of the preceding embodiments; and II. connecting the single-use system to at least one supply of at least one fluidic material and at least partially filling the single-use system with the fluidic material.

Embodiment 34: A test system for integrity testing of at least one single-use system for processing at least one fluidic material, the single-use system having at least one plastic component, the test system comprising:

a.) at least one test gas supply, specifically at least one test gas supply connectable to at least one connector of the single-use system, for applying at least one test gas to at least one lumen of the single-use system, wherein the test gas has one or more of spectral absorption or spectral emission properties in the infrared spectral range being distinguishable from ambient air; and b.) at least one infrared camera for monitoring at least a part of the single-use system.

Embodiment 35: The test system according to the preceding embodiment, wherein the test system further comprises:

c.) at least one evaluation device for evaluating the integrity of the single-use system, wherein the evaluation device is configured for deriving at least one item of integrity information from at least one image provided by the infrared camera.

Embodiment 36: The test system according to the preceding embodiment, wherein the evaluation device comprises at least one processor.

Embodiment 37: The test system according to any one of the two preceding embodiments, wherein the evaluation device comprises at least one image processing system.

Embodiment 38: The test system according to any one of the preceding embodiments referring to a test system, wherein the test system further comprises:

d.) at least one background element, wherein the test system is configured such that at least one part of the single-use system is positionable at least partially between the background element and the infrared camera.

Embodiment 39: The test system according to any one of the preceding embodiments referring to a test system, wherein the test system is configured for performing the method of integrity testing according to any one of preceding embodiments referring to a method of integrity testing.

Embodiment 40: A processing system for processing at least one fluidic material, comprising:

A. at least one single-use system for processing at least one fluidic material, the single-use system having at least one plastic component;

B. at least one test system according to any one of the preceding embodiments referring to a test system; and C. at least one supply of the fluidic material, wherein the single-use system is selectively connectable to the test gas supply of the test system and to the supply of the fluidic material, specifically in a switchable fashion.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
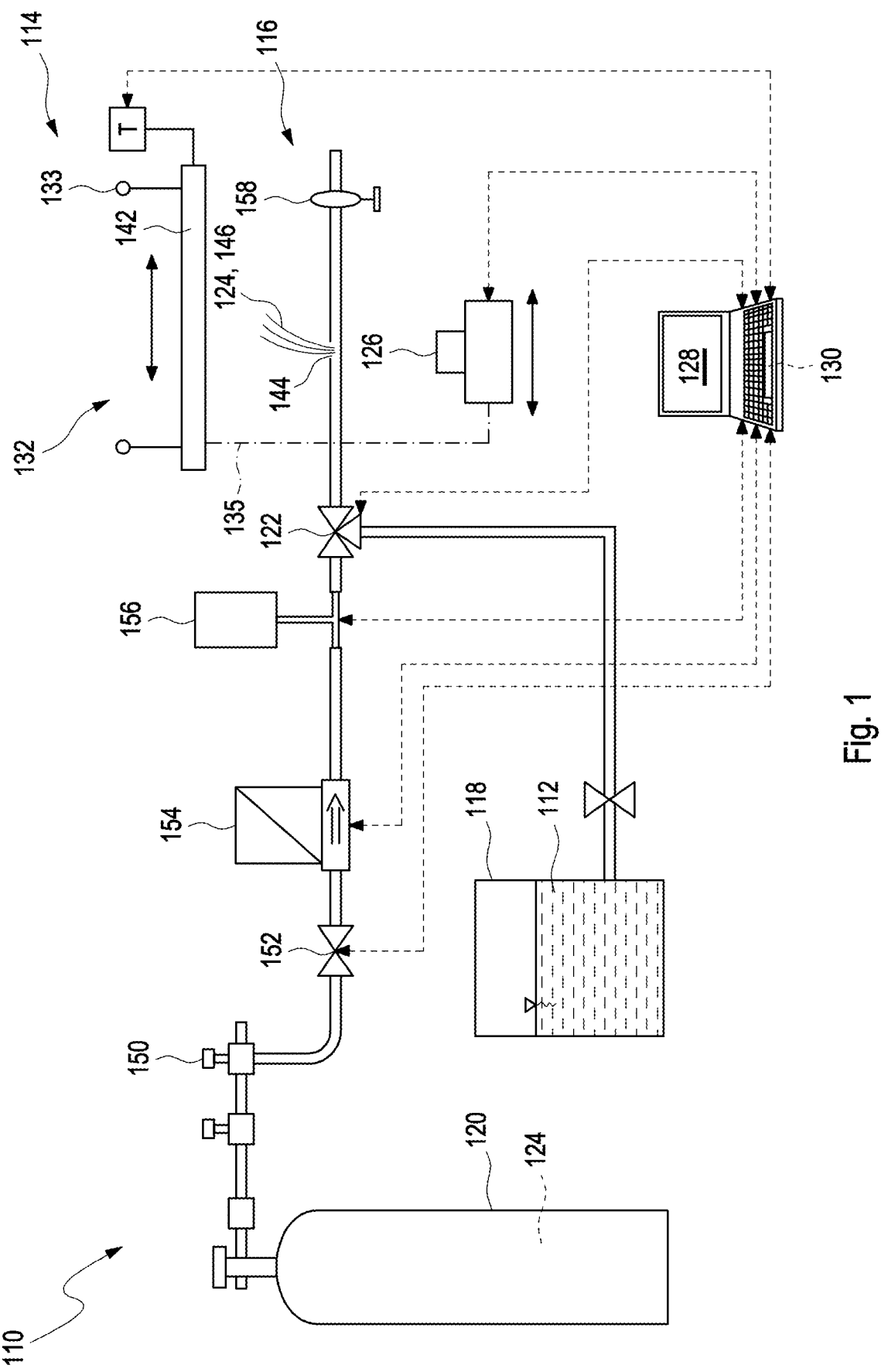
FIG. 1 shows embodiments of a processing system, a test system and a single-use system.

In FIG. 1, an embodiment of a processing system 110 for processing at least one fluidic material 112 is illustrated. Further, FIG. 1 shows an embodiment of a test system 114 for integrity testing of at least one single-use system 116 for processing the at least one fluidic material 112. The processing system 110 comprises the single-use system 116 for processing the fluidic material 112, and at least one supply 118 of the fluidic material 112. Further, the processing system 110 comprises the test system 114. The processing system 110 may specifically be configured for performing a method 117 of processing at least one fluidic material 112 by using at least one single-use system 116. The method 117 will be described with reference to exemplary embodiments shown in a flowchart illustrated in FIG. 2.

The test system 114 comprises at least one test gas supply 120, specifically at least one test gas supply 120 connectable to at least one connector 122 of the single-use system 116. The test gas supply 120 is configured for applying at least one test gas 124 to at least one lumen, e.g., to a volume, of the single-use system 116. Specifically, the test gas 124 has one or more of spectral absorption or spectral emission properties in the infrared spectral range being distinguishable from ambient air. Further, the test system 114 comprises at least one infrared camera 126 for monitoring at least a part of the single-use system 116. For example and as outlined above, a commercially available infrared camera may be used, such as a portable infrared camera or a stationary infrared camera, such as available from FLIR Systems, Inc., Wilsonville, Oregon, USA. As an example, a camera of the type GF343 was used in the experiments, e.g., for capturing the images of FIGS. 3A, 3B and 4 discussed in further detail below.

In the processing system 110, the single-use system may be selectively connectable to the test gas supply 120 of the test system 114 and to the supply 118 of the fluidic material 112, such as in a switchable fashion, for example by way of the connector 122, e.g., by 3-way valve.

Further, the test system 114 may comprise at least one evaluation device 128 for evaluating the integrity of the single-use system 116. In particular, the evaluation device 128 may be configured for deriving at least one item of integrity information from at least one image provided by the infrared camera 126. Thus, the evaluation device 128 and the infrared camera 126 may be configured for transmitting information, such as for transmitting the at least one image and/or at least one setting information, as is exemplarily illustrated in FIG. 1 by an arrow pointing from the evaluation device 128 to the infrared camera 126 and vice versa. Further, the evaluation device 128 may be used for controlling the connector 122, e.g., the 3-way valve, as is exemplarily illustrated in FIG. 1 by an arrow pointing from the evaluation device 128 to the connector 122 and vice versa. The evaluation device 128 further may comprise at least one processor 130.

The test system 114 may further comprise at least one background element 132. The background element 132 specifically may be temperature controlled, e.g., by using at least one temperature sensor 133 and/or at least one temperature controller. As an example, the background element 132 may be temperature controlled by using at least one heating and/or at least one cooling element and/or by using at least one temperature controller. Thus, as an example, the background element 132 may be kept at a temperature different from the ambient temperature and/or the temperature of the single-use system 116. As an example, as outlined above, a temperature difference between the background element and the ambient temperature and/or the temperature of the single-use system 116 of 2-10 K may be maintained, such as a temperature difference of 3-5 K.

Specifically, the test system 114 may be configured such that at least one part of the single-use system 116 may be positionable at least partially between the background element 132 and the infrared camera 126. The background element 132 and/or the camera 126 may be connected, e.g., by at least one connecting element 135, or may also be positionable independently. In particular, mechanically connecting the infrared camera 126 and the background element 132 by way of the connecting element 135, as illustrated in FIG. 1, may be an optional feature. The background element 132 and/or the camera 126 may also be positionable by one or more stages, e.g., automated stages, such as for automated testing, as indicated by the arrows at elements 126 and 132 in FIG. 1.

The test system 114 may specifically be configured for performing a method 134 of integrity testing of a single-use system 116 for processing at least one fluidic material 112. The method 134 will be described with reference to exemplary embodiments shown in a flowchart illustrated in FIG. 2.

The method 134 of integrity testing of a single-use system 116 for processing at least one fluidic material 112 comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The method 134 may comprise additional method steps that are not listed. The method steps are the following:

i.) (denoted with reference number 136) providing at least one single-use system 116 for processing at least one fluidic material 112, the single-use system 116 having at least one plastic component;

ii.) (denoted with reference number 138) applying, specifically via at least one connector 122 of the single-use system 116, at least one test gas 124 to at least one lumen of the single-use system 116, wherein the test gas 124 has one or more of spectral absorption or spectral emission properties in the infrared spectral range being distinguishable from ambient air; and iii.) (denoted with reference number 140) monitoring at least a part of the single-use system 116 by using an infrared camera 126.

The application of the one or more test gases in step 138 may, as an example, take place at a low pressure of 20-100 mbar, such as 50 mbar.

The method 134 may be fully or partially computer-controlled. Specifically, one or more of steps ii.) 138 and iii.) 140 of the method 134 may be computer-controlled.

The background element 132, as exemplarily illustrated in FIG. 1, may specifically comprise at least one visually uniform background screen 142. Further, the background element 132 may be temperature-controlled. Specifically, as exemplarily illustrated in FIG. 1 by an arrow pointing from the evaluation device 128 to the background element 132 and vice versa, the temperature of the background element 132 may be controlled by using the evaluation device 128. As an example, the background element may be one or both of actively heated or actively cooled. It shall be noted, however, that a passive heating and/or a passive cooling may also be possible.

Step iii.) 140 may further comprise detecting one or more leakages 144 in the single-use system 116. As an example, the leakage detecting in step iii.) may comprise detecting the egression of test gas 124 from the single-use system 116, wherein specifically at least one jet 146, at least one stream, at least one cloud or at least one mist of the test gas 124 may be detected.

The method 134 may comprise a further step of returning at least one integrity result (denoted with reference number

148). The integrity result may specifically quantify or qualify the integrity of the single-use system. For returning the at least one integrity result, as an example, the method may further comprise automatically quantifying the leakage 144 of the single-use system, e.g., by visually evaluating the jet 146 of the test gas 124. In particular, image recognition may be used for evaluating a jet profile of the test gas 124.

In step ii.) 138, the test gas 124 may be applied to the lumen, e.g., to the volume, of the single-use system 116 at a pressure, specifically an overpressure. The pressure of the test gas 124 in the single-use system 116 may be a parameter that should be controlled, defined or at least known in a precise fashion. Thus, the test system 114 may comprise one or more of a pressure regulator 150, a valve 152, a mass-flow meter 154, a pressure meter 156, a clamp 158, a sterile filter or any further element suited for controlling and/or monitoring the pressure or flow of the test gas 124. In particular, information on the pressure and/or on the flow of test gas 124 may be transmitted and processed by using the evaluation device 128, as is exemplarily illustrated in FIG. 1 by arrows pointing from the evaluation device 128 to any one of the pressure regulator 150, the valve 152, the mass-flow meter 154 and the pressure meter 156 and vice versa.

The method 134 of integrity testing of a single-use system 116 may be comprised by the method 117 of processing at least one fluidic material 112 by using at least one single-use system 116. In particular, the method 117 of processing at least one fluidic material 112 by using at least one single-use system 116 comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The method 117 may comprise additional method steps that are not listed. The method steps are the following:

I. (denoted with reference number 160) testing the integrity of the single-use system 116 by using the method 134 of integrity testing of a single-use system 116; and II. (denoted with reference number 162) connecting the single-use system 116 to at least one supply 118 of at least one fluidic material 112 and at least partially filling the single-use system 116 with the fluidic material 112.

Figure 2:
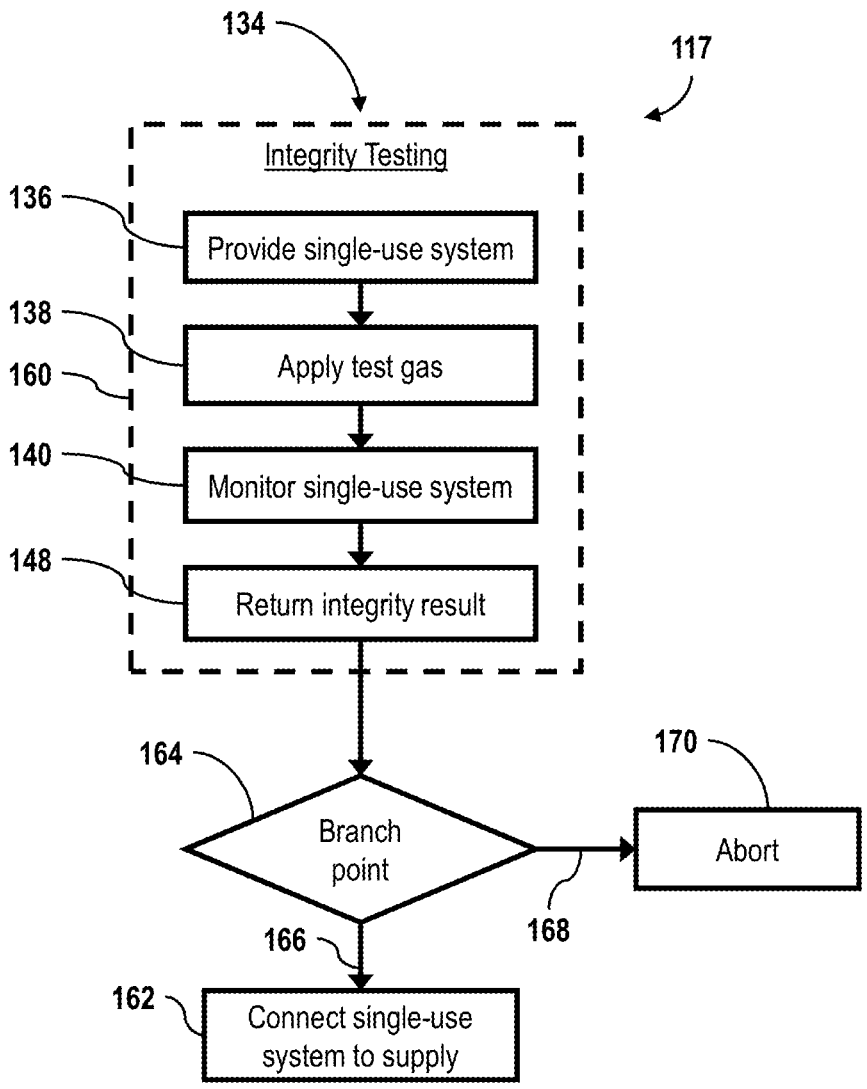
FIG. 2 shows a flow chart of an embodiment of a method of processing at least one fluidic material by using at least one single-use system and of an embodiment of a method of integrity testing.

Further, as exemplarily illustrated in FIG. 2, the method 117 may comprise a branching point 164. The branching point 164 may indicate a condition query, such as deciding between a first branch 166 and a second branch 168. For example, the condition query may make use of the integrity result. Specifically, the integrity result may comprise at least one item of information quantifying and/or qualifying the integrity of the single-use system 116. As an example, the first branch 166 may indicate integrity of the single-use system 116, such as indicating the single-use system 116 to be sufficiently intact. Thus, the first branch 166 leads to step II. 162, wherein the single-use system 116 may be connected to the supply 118 of the fluidic material 112 and subsequently be filled with the fluidic material 112.

The second branch 168 may indicate the single-use system 116 to not be sufficiently intact, e.g., to comprise at least one leakage such that the single-use system 116 does not fulfill an integrity criteria necessary to be fulfilled in order for the single-use system 116 to be used in the method 117 of processing at least one fluidic material 112 by using at least one single-use system 116. Thus, the second branch 168 leads to aborting the method 117, the step of aborting being denoted with reference number 170.

Figure 3:
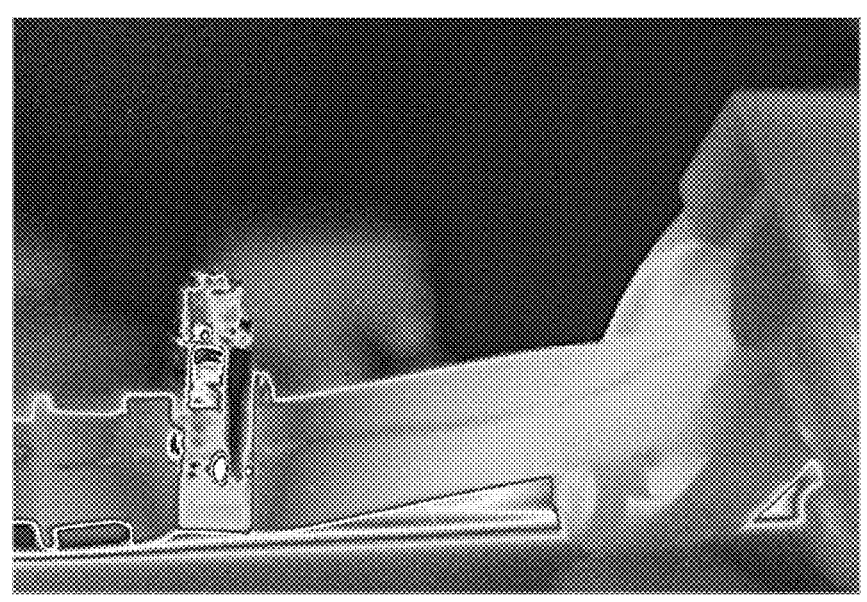
FIG. 3A shows an image of a part of a single-use system, without using a temperature-controlled background element.
FIG. 3B shows an image of the part of a single-use system of FIG. 3A, using a temperature-controlled background element.
Figure 3:
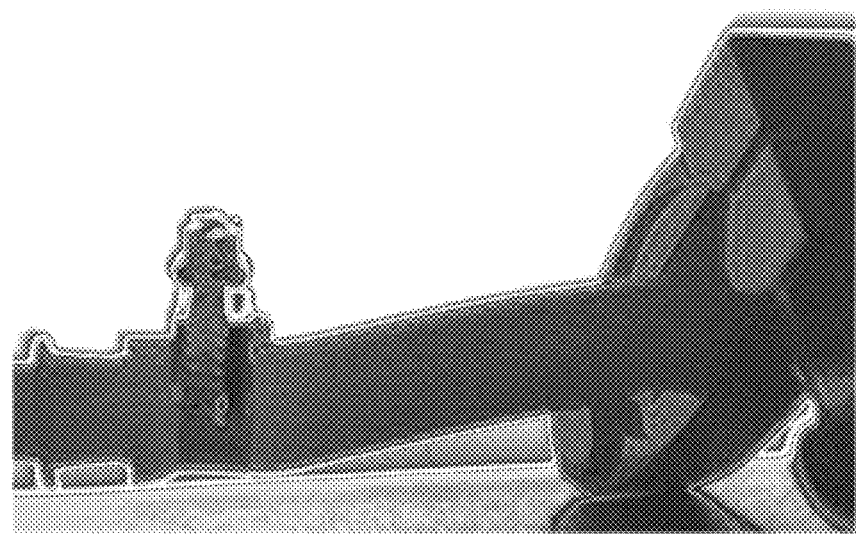
Figure 4:
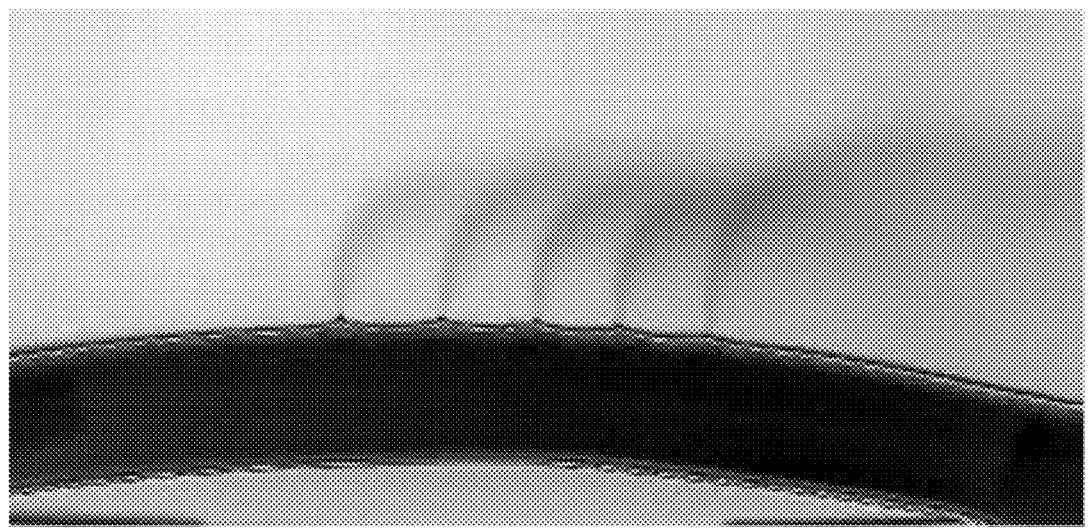
FIG. 4 shows an example of an image for leakage testing of a component of a single-use system.

In FIGS. 3A, 3B and 4, examples of images captured by using the method of FIG. 2 are shown. The images were taken by using the above-mentioned infrared camera GF343 by FLIR Systems, Inc.

Thus, firstly, in FIGS. 3A and 3B, the significant improvements of image recognition by using the background element 132 are demonstrated. Both images were taken at room temperature of 22° C. In FIG. 3A, an image of a part of a single-use system is shown without using any background element. It is clearly visible that the contrast of the image is rather low. Specifically, neither tubing walls nor details of the surfaces of the elements are visible. Contrarily, in FIG. 3B, an image of the same setup captured with a background element is shown, wherein the background element was kept at a temperature different from the room temperature. In this case, a fluid-heated background element, having a temperature of 28° C., was used. It is clearly visible that the contrast was greatly improved by this measure. Thus, the walls of the tubings are clearly visible, and fine details of the structures can be detected.

In FIG. 4, an image of a leakage test is shown, using the heated background element as in FIG. 3B. Therein, a plastic tube was perforated with a cannula having a diameter of 50 μm. The plastic tube was pressurized with carbon dioxide having a pressure of 50 mbar. The five leakages intentionally inserted into the tubing wall for this purpose are clearly visible by detecting gas jets of the test gas in the image. Image analysis, such as automated image recognition software, may be used for analyzing the gas jets. Thereby, with the knowledge of the pressure and data derived from the image analysis, the location and even the size of the leakages may be derived.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 110 processing system
112 fluidic material
114 test system
116 single-use system
117 method of processing at least one fluidic material
118 supply of fluidic material
120 test gas supply
122 connector
124 test gas
126 infrared camera
128 evaluation device
130 processor
132 background element
133 temperature sensor
134 method of integrity testing of a single-use system
135 connecting element
136 step i.)
138 step ii.)
140 step iii.)
142 background screen
144 leakage
146 jet of test gas
148 returning at least one integrity result 150 pressure regulator
152 valve
154 mass-flow meter
156 pressure meter
158 clamp
160 step I.
162 step II.
164 branching point
166 first branch
168 second branch
170 aborting the method

What is claimed is:

1. A method of integrity testing of a single-use system for processing at least one fluidic material, the method comprising:
    i) providing at least one single-use system for processing at least one fluidic material, the single-use system having at least one plastic component;
    ii) connecting a lumen of the single-use system to a supply line, wherein the supply line is connected to a valve that is switchable between a test gas supply and a fluidic material supply;
    iii) switching the valve to apply only the test gas to the single-use system, wherein the test gas has one or more of spectral absorption or spectral emission properties in the infrared spectral range distinguishable from ambient air;
    iv) monitoring at least a part of the single-use system by using an infrared camera;
    v) confirming the integrity of the single-use system; and
    vi) automatically switching the valve to introduce only the at least one fluidic material through the supply line and into the single-use system.

2. The method according to claim 1, wherein the test gas comprises carbon dioxide.

3. The method according to claim 1, further comprising using at least one flow controller configured for controlling at least one of a flow velocity of the ambient air, a mass flow rate of the ambient air, and a volume flow rate of the ambient air.

4. The method according to claim 1, wherein the at least one plastic component is selected from the group consisting of: at least one connector element at least partially made of plastic; at least one tubing element at least partially made of plastic; at least one bag element at least partially made of plastic; at least one container element at least partially made of plastic; at least one valve element at least partially made of plastic; at least one filter capsule; at least one sampling system comprising at least one bag and/or at least one capsule; and at least one syringe.

5. The method according to claim 1, wherein step iii.) comprises providing at least one background element, wherein the at least one part of the single-use system monitored by using the infrared camera is positioned at least partially between the background element and the infrared camera.

6. The method according to claim 5, wherein the single-use-system is positioned at a distance L from the at least one background element, wherein $0 \text{ m} \leq L \leq 0.5 \text{ m}$.

7. The method according to claim 5, wherein the background element comprises at least one visually uniform background screen.

8. The method according to claim 5, wherein the background element is mechanically connected to the infrared camera.

9. The method according to claim 5, wherein the background element is temperature-controlled.

10. The method according to claim 5, wherein the background element is at least one of actively heated or actively cooled.

11. The method according to claim 10, wherein the background element is at least one of actively heated or actively cooled by at least one of a fluidic tempering element and an electric tempering element.

12. The method according to claim 11, wherein any one of the fluidic tempering element and/or the electric tempering element is arranged in meanders within the background element.

13. The method according to claim 5, wherein the background element is at least partially made of one or more of a plastic material, a ceramic material, and a metal material.

14. The method according to claim 5, wherein the integrity testing is performed at an ambient temperature and the background element is maintained at a background temperature differing from the ambient temperature, wherein the background temperature differs from the ambient temperature by at least 2 K.

15. The method according to claim 14, wherein the background temperature is higher than the ambient temperature.

16. The method according to claim 14, wherein the ambient temperature is room temperature and wherein the background temperature is 26° C. to 60° C.

17. The method according to claim 1, wherein the single-use-system is positioned at a distance d from the infrared camera, wherein 0 m<d≤2 m.

18. The method according to claim 1, further comprising returning at least one integrity result that quantifies and/or qualifies the integrity of the single-use system.

19. The method according to claim 1, wherein step iii.) comprises visually detecting the egression of test gas from the single-use system.

20. The method according to claim 19, wherein the visually detecting the egression comprises detecting at least one of a jet, a stream, a cloud or a mist of the test gas, wherein the method comprises automatically quantifying a leakage of the single-use system by visually evaluating the jet, the stream, the cloud or the mist of the test gas, respectively.

21. The method according to claim 1, further comprising using automatic image recognition.

22. The method according to claim 1, wherein, in step ii.), the test gas is applied to the lumen of the single-use system at a pressure of 5 mbar to 300 mbar.

23. The method according to claim 1, wherein step iii.) comprises scanning the single-use system by sequentially monitoring different parts of the single-use system.

24. A test system for integrity testing of at least one single-use system for processing at least one fluidic material, the single-use system having at least one plastic component, the test system comprising:
  a) at least one test gas supply configured for applying at least one test gas to at least one lumen of the single-use system, wherein the test gas has one or more of spectral absorption or spectral emission properties in the infrared spectral range being distinguishable from ambient air;
  b) at least one infrared camera for monitoring at least a part of the single-use system; and
  c) a supply line coupled to the single-use system comprising a valve configured to switch between the test gas supply and a fluidic material supply.

25. The test system according to claim 24, further comprising:
  d) at least one evaluation device for evaluating the integrity of the single-use system, wherein the evaluation device is configured for deriving at least one item of integrity information from at least one image provided by the infrared camera.

26. The test system according to claim 24, further comprising:
  e) at least one background element, wherein the test system is configured such that at least one part of the single-use system is positionable at least partially between the background element and the infrared camera.

* * * * *